United States Patent

[11] 3,538,929

[72] Inventor Lawrence A. Botkin
 Omaha, Nebraska
[21] Appl. No. 760,025
[22] Filed Sept. 16, 1968
[45] Patented Nov. 10, 1970
[73] Assignee Fruehauf Corporation
 Detroit, Michigan
 a corporation of Michigan

[54] VALVE ACTUATOR
 7 Claims, 9 Drawing Figs.
[52] U.S. Cl. .................................................. 137/77,
 74/2; 251/67, 251/294
[51] Int. Cl. ............................................... F16k 31/00
[50] Field of Search........................................ 251/66, 67,
 72—74, 76, 303, 313, 294; 267/154, 155; 137/72,
 73, 75—77, 65; 74/2

[56] References Cited
 UNITED STATES PATENTS
| 1,546,637 | 7/1925 | Ernst | 137/77 |
| 1,736,289 | 11/1929 | Murray | 137/77 |
| 1,840,959 | 1/1932 | Kraft | 137/75 |
| 1,960,973 | 5/1934 | Knight | 137/65 |
| 2,665,714 | 1/1954 | Greenwood | 137/77X |

Primary Examiner—William F. O'Dea
Assistant Examiner—Richard Gerard
Attorney—Harness, Dickey & Pierce ABSTRACT: The valve actuator is spring operated to rotate a valve handle when the tension of the spring is released. When the actuator is locked, the handle is moved in the normal manner to operate the valve. The spring tension is released either remotely by manual means or by fusible means located adjacent to the tensioned spring and valve.

Patented Nov. 10, 1970
3,538,929
Sheet 1 of 2
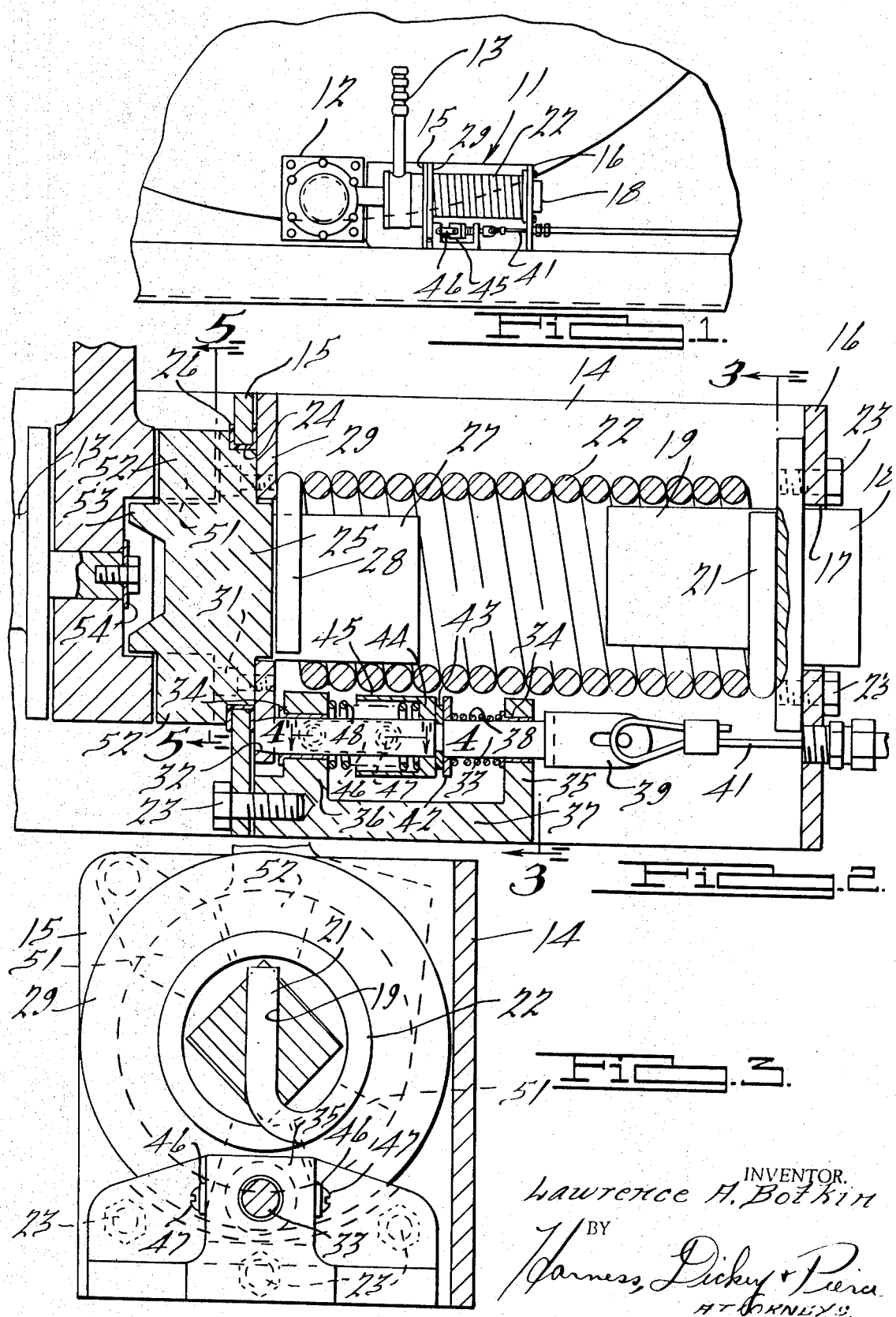
INVENTOR.
Lawrence A. Botkin
BY
Harness, Dickey & Pierce
ATTORNEYS

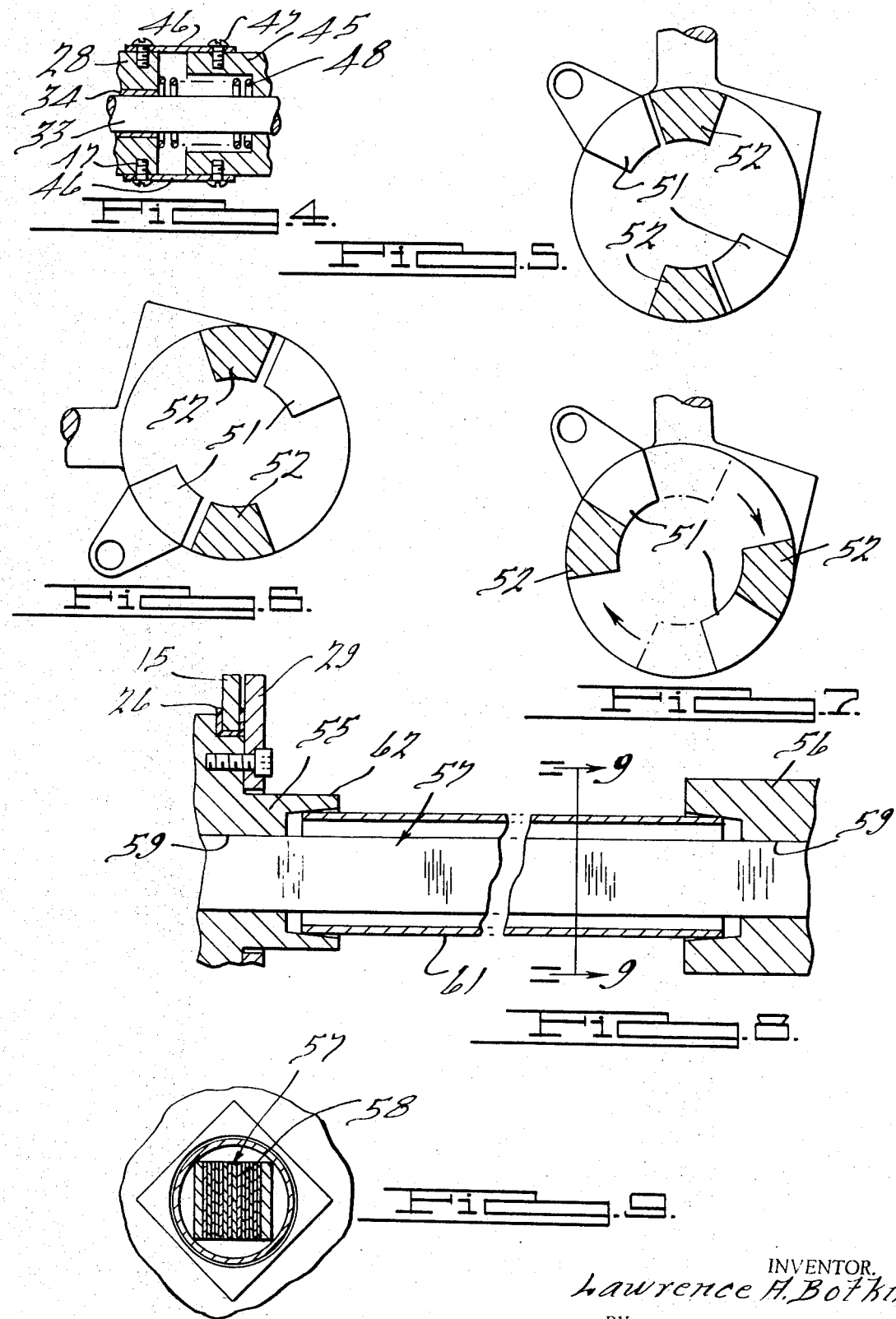

3,538,929

VALVE ACTUATOR

RELATED APPLICATION

Reference may be had to the application of T. J. Mohrhusen, Ser. No. 677,502 filed Oct. 17, 1967 for Combination Gravity and Pneumatic Discharge System for Hoppers. This application illustrates a butterfly type of valve which is manually operated and to which the actuator of the present invention is applied.

BACKGROUND OF THE INVENTION

Reference may be had to U.S. Pat. No. 2,137,685 which discloses an actuator which is applied to a gate valve and not to a rotary type valve.

SUMMARY OF THE INVENTION

The actuator has a rotatable head containing projections which are engageable with those of the handle to close the valve while permitting its operation by the handle in the normal manner. A coil spring or a spring bar is tensioned for rotating the head and is restrained by a trigger device which is remotely actuated or actuated by a spring which is retained inactive by fusible elements. When the head is released it rotates to have its projections engage the projections on the handle which is moved thereby to valve closed position. The valve remains independent of the actuation so that the bodies are free to be interchanged when used for different chemicals or dry products. The actuator is rugged, positive in operation and, actuated by a remote manual control or by fusible elements and is economical of manufacture.

BRIEF DESCRIPTION OF THE DRAWINGS

FIG. 1 is a broken end view of a hopper having a valve actuator embodying features of the present invention;

FIG. 2 is an enlarged broken sectional view of the actuator illustrated in FIG. 1.

FIG. 3 is a sectional view of the structure illustrated in FIG. 2, taken on the line 3–3 thereof;

FIG. 4 is a sectional view of the structure illustrated in FIG. 2, taken on the line 4–4 thereof;

FIG. 5 is a broken sectional view of the structure illustrated in FIG. 2, taken on the line 5–5 thereof with the valve shown in closed position and the actuating spring tensioned;

FIG. 6 is a view of the structure illustrated in FIG. 5 after the manual operation of the valve;

FIG. 7 is a view of the structure illustrated in FIG. 6 after the actuator has been released and the valve moved to close position thereby;

FIG. 8 is a broken view of structure, similar to that illustrated in FIG. 2, showing another form of tensioning spring, and FIG. 9 is a sectional view of the structure illustrated in FIG. 8, taken on the line 9–9 thereof.

DESCRIPTION OF THE PREFERRED EMBODIMENTS

The valve actuator 11 of the present invention is applied to a standard butterfly or like rotary valve 12 which is manually actuated by a handle 13. A back plate 14 has a pair of forwardly projecting plates 15 and 16 supported thereby. The plate 16 has an aperture 17 therein for supporting a head 18 having a slot 19 therein which receives and end 21 of a coil spring 22, the head 18 being secured in position by screws 23. The plate 15 has an aperture 24 therein for supporting a head 25 for rotation on an annular channel shaped bearing element 26 made of nylon or like plastic material. The head 25 has a slot 27 which receives an end 28 at the opposite end of the spring 22. The head has a washerlike plate 29 secured thereto by screws 31 and provided with a truncated conical aperture 32 which receives the tapered end of a plunger 33. The plunger is mounted in nylon or like sleeves 34 in uprights 35 and 36 of a member 37 which is secured by screws 23 to the plate 15. After the head 25 is locked by the plunger 33, the head 18 is turned through approximately 360° to provide a preload to the spring 22 after which the head 18 is locked in position by the screws 23.

A cable clip 39 on the remote end of the plunger has a cable 41 connected thereto so that the plunger can be withdrawn when actuated from a remote point. A spring 38 abuts the inner face of the upright 35 and a collar 42 retained in position on the plunger by a split spring washer 43. A washer 44 is mounted on the plunger 33 forwardly of the washer 43 having a pair of arms 45 to which fusible elements 46 are secured by screws 47 and to the sides of the upright 36. A spring 48 substantially heavier than the spring 38 is disposed over the plunger 33 between the washer 44 and the inner face of the upright. When a fire occurs adjacent to the actuator, the fusible elements 46 will melt and the tension in the spring 48 will move the plunger 33 to the right withdrawing the end from the aperture 32. The plunger 33 forms a trigger device which when actuated releases the head 25 which moves the handle 13 to close the valve.

The handle 13 has a pair of spaced projections 51 thereon which are diametrically disposed as illustrated in FIGS. 5, 6 and 7. Similar projections 52 extending forwardly from the head 25, maintained in position by fingers 53 extending into a cylindrical recess 54 on the adjacent face of the handle. When the valve is in closed position, the relationship of the projections 51 and 52 is illustrated in FIG. 5. When the handle has been moved 90° to open the valve the relationship of the projection 51 and 52 is illustrated in FIG. 6. It will be noted that the 90° movement from open to closed position of the handle will occur without interference between the projection. When the handle is in valve open position as illustrated in FIG. 6 and the plunger 33 is retracted either by the cable 41 or by the melting of the fusible elements 46, the head 25 is released and rotated by the spring 22 to move the projections 52 from the position illustrated in FIG. 6 to that illustrated in FIG. 7. This moved the handle 90° to valve closed position with the projections 51 shown in the same position as they are in FIG. 5, and the projections 52 in abutting engagement therewith.

When the handle is again moved from valve open to valve close position, the head 25 is moved therewith until the aperture 32 becomes aligned with the plunger 33. The plunger will be urged forwardly by the spring 38 into the aperture to lock the head 25 in its retracted position. If the fusible elements 46 had melted to release the plunger, new fuse elements would first be installed to have the spring 48 retracted, as illustrated in FIGS. 2 and 4. The actuator is unique in that it occupies a small space and may be attached to a rotary valve without interfering with the normal manual operation thereof. The withdrawal of the plunger 33 remotely or by the melting of the fusible elements 46 releases the rotatable head 25 which returns the valve handle and the valve to close position.

In FIG. 8 another form of the invention is illustrated that wherein a head 55 is substituted for the head 25 and a head 56 is substituted for the head 18 of the embodiment illustrated in FIG. 2. A spring bar 57 which may be solid or made up of leaf spring elements 58, is secured in square apertures 59 in the heads 55 and 56 and twisted approximately 360° to provide a preload thereto. A sleeve 61 may be placed over the bar 57 secured in apertured projections 62 at the ends of the heads 55 and 56. The structure otherwise is the same as that illustrated and described in FIGS. 1 to 7.

I claim:

1. In an actuator for a rotary valve, a manually actuated operating element for the valve having projections, a pair of spaced parallel supports, a spring between said supports, a head fixed to one of said supports and secured to one end of the spring, a rotatable head on the other support to the opposite end of the spring, said fixed head being aligned with said rotatable head, projecting means on the forward face of the rotatable head engageable with projecting means on the valve operating element, and trigger means for retaining the rotatable head in spring tensioned position.

2. In an actuator for a rotary valve as recited in claim 1, wherein a remotely actuated cable on the trigger means permits the closing of the valve manually from a remote point, and wherein fusible means on an actuator which is moved with the trigger means when released by the cable releases the trigger means independently of said cable when the fusible means is melted.

3. In an actuator for a rotary valve as recited in claim 1, wherein the spring is of a coil type which is preloaded and into the ends of which said heads extend.

4. In an actuator for a rotary valve as recited in claim 1, wherein the spring is of the bar type which is twisted to provide a preload thereto when supported in said aligned heads.

5. In an actuator for a rotary valve as recited in claim 1, wherein the rotatable head has an aperture and wherein the trigger means is a plunger supported on a pair of spaced uprights, a spring on the plunger, and a collar on the plunger engaged by the latter spring for urging the plunger forwardly into engagement with said aperture in the rotatable head.

6. In an actuator for a rotary valve as recited in claim 5, wherein a washer is provided forwardly of said collar on the plunger having a pair of extending arms, a spring about the plunger between the washer and the forward upright, and fusible links secured to the arms and said forward upright for maintaining said last spring compressed.

7. In an actuator for a rotary valve as recited in claim 1, wherein the valve operating element is a handle having a cylindrical recess in the face adjacent to the rotatable head, and means on the rotatable head extending within said recess for positioning the rotatable head of the actuator relative to the handle.